(12) United States Patent
Ohno et al.

(10) Patent No.: US 7,449,427 B2
(45) Date of Patent: Nov. 11, 2008

(54) HONEYCOMB STRUCTURED BODY

(75) Inventors: Kazushige Ohno, Gifu (JP); Hiroki Sato, Gifu (JP); Masayuki Hayashi, Gifu (JP); Kazutake Ogyu, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 0 days.

(21) Appl. No.: 11/518,998

(22) Filed: Sep. 12, 2006

(65) Prior Publication Data

US 2007/0065348 A1 Mar. 22, 2007

Related U.S. Application Data

(63) Continuation of application No. PCT/JP2005/017869, filed on Sep. 28, 2005.

(30) Foreign Application Priority Data

Sep. 30, 2004 (JP) ............................. 2004-287713

(51) Int. Cl.
*B01J 23/02* (2006.01)
*B32B 3/12* (2006.01)
*B28B 1/00* (2006.01)
*B28B 3/00* (2006.01)
*B28B 5/00* (2006.01)
*C04B 33/32* (2006.01)
*C04B 33/36* (2006.01)
*C04B 35/64* (2006.01)

(52) U.S. Cl. ............. 502/439; 502/527.19; 502/527.15; 502/527.12; 428/116; 264/630; 156/89.22

(58) Field of Classification Search ................. 502/439, 502/527.19, 527.15, 527.12; 428/116; 156/89.22; 264/630
See application file for complete search history.

(56) References Cited

U.S. PATENT DOCUMENTS 5,278,113 A * 1/1994 Ono et al. ..................... 502/66

(Continued)

FOREIGN PATENT DOCUMENTS

JP HEI 9-158710 6/1997

(Continued)

OTHER PUBLICATIONS

U.S. Appl. No. 10/518,548, unpublished.

(Continued)

*Primary Examiner*—Jerry Lorengo
*Assistant Examiner*—Patricia L Hailey
(74) *Attorney, Agent, or Firm*—Finnegan, Henderson, Farabow, Garrett & Dunner, LLP

(57) ABSTRACT

The honeycomb structured body of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein an average pore diameter of the porous ceramic member is larger than an average particle diameter of particles constituting the catalyst supporting layer, and when a pore diameter distribution of the porous ceramic member and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic member.

14 Claims, 5 Drawing Sheets

U.S. PATENT DOCUMENTS

| | | |
|---|---|---|
| 5,914,187 A | 6/1999 | Naruse et al. |
| 6,669,751 B1 * | 12/2003 | Ohno et al. ............... 55/523 |
| 6,773,481 B2 | 8/2004 | Noguchi et al. |
| 2003/0039598 A1 | 2/2003 | Nishimura et al. |
| 2003/0093982 A1 * | 5/2003 | Suwabe et al. ............ 55/523 |
| 2004/0055265 A1 | 3/2004 | Ohno et al. |
| 2004/0161596 A1 * | 8/2004 | Taoka et al. ............ 428/304.4 |
| 2005/0076626 A1 | 4/2005 | Kudo et al. |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0229565 A1 | 10/2005 | Yoshida |
| 2005/0235621 A1 * | 10/2005 | Kunieda et al. ............ 55/523 |
| 2005/0247038 A1 | 11/2005 | Takahashi |
| 2005/0272602 A1 | 12/2005 | Ninomiya |
| 2006/0051556 A1 * | 3/2006 | Ohno et al. ............ 428/116 |
| 2006/0154021 A1 | 7/2006 | Ohno et al. |
| 2006/0166820 A1 | 7/2006 | Ogyu et al. |
| 2006/0172113 A1 | 8/2006 | Kunieda |
| 2006/0177629 A1 * | 8/2006 | Kunieda ............ 428/116 |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228520 A1 * | 10/2006 | Masukawa et al. ......... 428/116 |
| 2006/0230732 A1 | 10/2006 | Kunieda |
| 2007/0028575 A1 * | 2/2007 | Ohno et al. ............ 55/523 |
| 2007/0092691 A1 * | 4/2007 | Fujita ............ 428/116 |

FOREIGN PATENT DOCUMENTS

| | | |
|---|---|---|
| JP | HEI 9-220423 | 8/1997 |
| JP | HEI 9-276708 | 10/1997 |
| JP | 2002-219319 | 8/2002 |
| JP | 2002-357114 | 12/2002 |
| JP | 2004-058013 | 2/2004 |
| JP | 2004-330118 | 11/2004 |
| JP | 2005-152774 | 6/2005 |

OTHER PUBLICATIONS

U.S. Appl. No. 11/476,929, unpublished.
U.S. Appl. No. 11/513,149, unpublished.
Related case list.
International Preliminary Report on Patentability (PCT/JP2005/017869).

* cited by examiner

A-A line cross-section view

B-B line cross-section view

HONEYCOMB STRUCTURED BODY

CROSS REFERENCE TO RELATED APPLICATIONS

This application is a continuation application of PCT/JP2005/017869 filed on Sep. 28, 2005, which claims priority of Japanese Patent Application No. 2004-287713 filed on Sep. 30, 2004. The contents of these applications are incorporated herein by reference in their entirety.

BACKGROUND OF THE INVENTION

1. Field of the Invention

The present invention relates to a honeycomb structured body.

2. Discussion of the Background

In recent years, particulates such as soot and the like contained in exhaust gases discharged from internal combustion engines of vehicles, such as buses and trucks, and construction machines, have raised serious problems as those particulates are harmful to the environment and the human body.

There have been proposed various honeycomb structured bodies made from porous ceramics, which serve as filters capable of capturing particulates in exhaust gases to purify the exhaust gases.

Conventionally, with respect to the honeycomb structured body of this type, JP-A 2002-219319 has disclosed a filter made from porous cordierite, in which a number of through holes, each having either one of ends being sealed, extend in a longitudinal direction with a partition wall interposed therebetween so that a number of cells are formed, and this filter (porous cordierite) has a pore distribution of the following ratio: pore volume of pores having a pore diameter of less than 10 μm: 15% or less of the entire pore volume, pore volume of pores having a pore diameter in a range from 10 to 50 μm: 75% or more of the entire pore volume, and pore volume of pores having a pore diameter exceeding 50 μm: 10% or less of the entire pore volume.

JP-A 2002-357114 discloses an exhaust gas purifying filter having the same structure as that of JP-A 2002-219319 with a catalyst used for oxidizing and removing particulates being adhered to a partition wall, and in this structure, the porosity is set to 55 to 80%, the average pore diameter is set in a range of 30 to 50 μm and the pore volume of pores having a pore diameter of 100 μm or more is set to 5% or less of the entire pore volume.

The contents of JP-A 2002-219319 and JP-A 2002-357114 are incorporated herein by reference in their entirety.

SUMMARY OF THE INVENTION

A honeycomb structured body in accordance with a first aspect of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein an average pore diameter of the porous ceramic member is larger than an average particle diameter of particles constituting the catalyst supporting layer, and when a pore diameter distribution of the porous ceramic member and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic member.

The honeycomb structured body according to the first aspect of the present invention desirably comprises a silicon carbide based ceramics or a composite body of silicon and silicon carbide.

In the honeycomb structured body according to the first aspect of the present invention, the porosity of the porous ceramic member is desirably at least about 40% and at most about 75%.

In the honeycomb structured body according to the first aspect of the present invention, the porosity of the porous ceramic member is desirably in the range of about 40% to about 65%.

The average pore diameter of the honeycomb structured body according to the first aspect of the present invention is desirably at least about 10 μm and at most about 50 μm.

In the honeycomb structured body according to the first aspect of the present invention, the amount of the catalyst supporting layer is desirably at least about 20 g/l and at most about 150 g/l.

In the honeycomb structured body according to the first aspect of the present invention, the catalyst supporting layer desirably comprises at least one of alumina, titania, zirconia, silica and ceria.

A honeycomb structured body in accordance with a second aspect of the present invention is a honeycomb structured body comprising a porous ceramic having a plurality of cells which are allowed to penetrate in a longitudinal direction with a wall portion therebetween and either one end of which is sealed, with a catalyst supporting layer being adhered to the wall portion, wherein an average pore diameter of the porous ceramic is larger than an average particle diameter of particles constituting the catalyst supporting layer, and when a pore diameter distribution of the porous ceramic and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic.

The honeycomb structured body according to the second aspect of the present invention is desirably made of cordierite or aluminum titanate.

In the honeycomb structured body according to the second aspect of the present invention, the porosity of the porous ceramic is desirably at least about 40% and at most about 75%.

In the honeycomb structured body according to the second aspect of the present invention, the porosity of the porous ceramic is desirably in the range of about 40% to about 65%.

The average pore diameter of the honeycomb structured body according to the second aspect of the present invention is desirably at least about 10 μm and at most about 50 μm.

In the honeycomb structured body according to the second aspect of the present invention, the amount of the catalyst supporting layer is desirably at least about 20 g/l and at most about 150 g/l.

In the honeycomb structured body according to the second aspect of the present invention, the catalyst supporting layer desirably comprises at least one of alumina, titania, zirconia, silica and ceria.

In the following description, a honeycomb structured body having a structure in which a plurality of porous ceramic members are combined with one another through an adhesive layer, such as the honeycomb structured body in accordance with the first aspect of the present invention, is referred to as an aggregated honeycomb structured body. In contrast, a honeycomb structured body having an integral form as a whole, such as the honeycomb structured body in accordance with the second aspect of the present invention, is referred to as an integral honeycomb structured body. Moreover, in the case where it is not necessary to specifically distinguish the integral honeycomb structured body and the aggregated honeycomb structured body, this is simply referred to as "honeycomb structured body".

DESCRIPTION OF THE EMBODIMENTS

The honeycomb structured body in accordance with the embodiments of the first aspect of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein an average pore diameter of the porous ceramic member is larger than an average particle diameter of particles constituting the catalyst supporting layer, and when a pore diameter distribution of the porous ceramic member and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic member.

Figure 1:
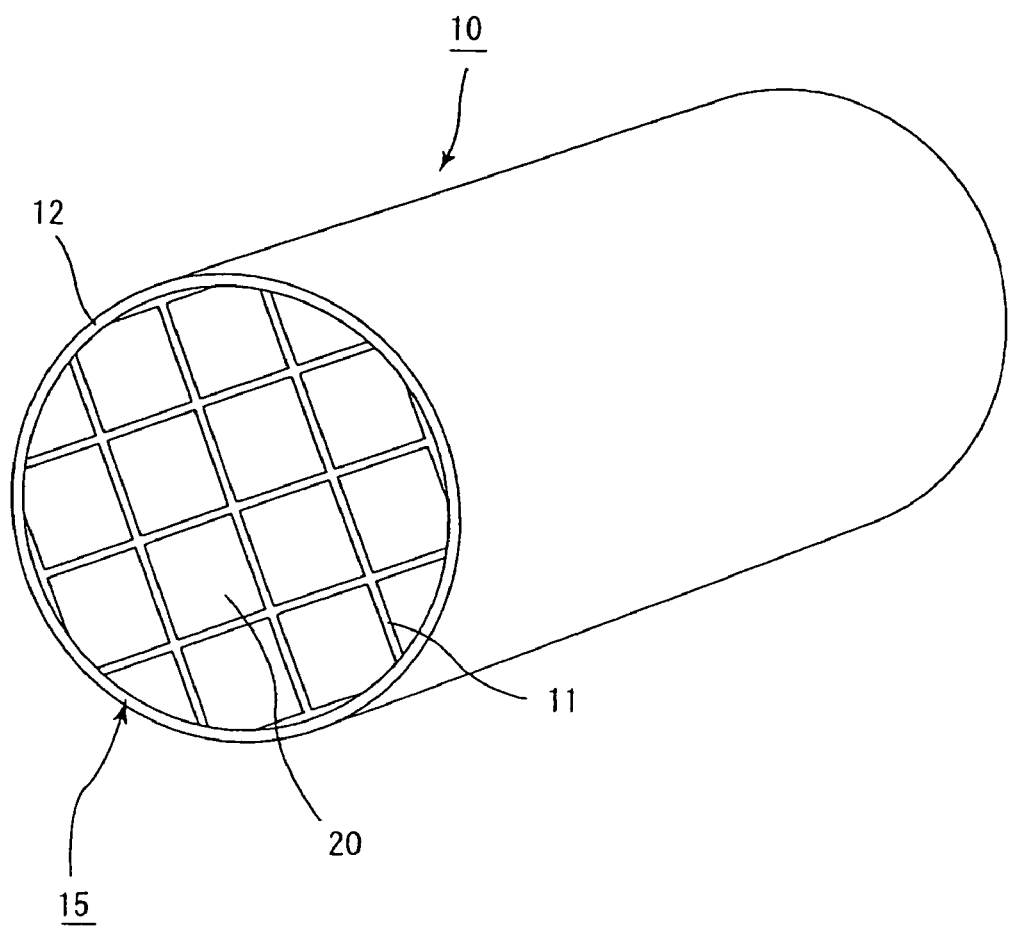
FIG. 1 is a perspective view that schematically shows one example of a honeycomb structured body according to one embodiment of the first aspect of the present invention.
Figure 2A:
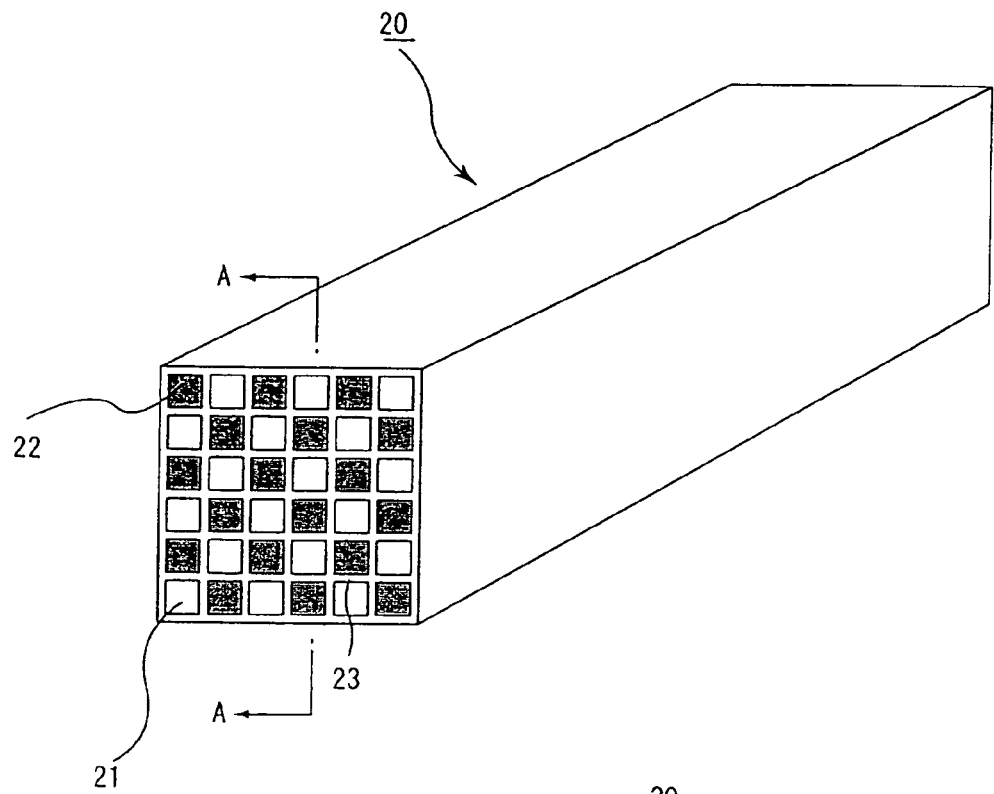
FIG. 2A is a perspective view that schematically shows porous ceramic members that constitute a honeycomb structured body according to one embodiment of the first aspect of the present invention.
Figure 2B:
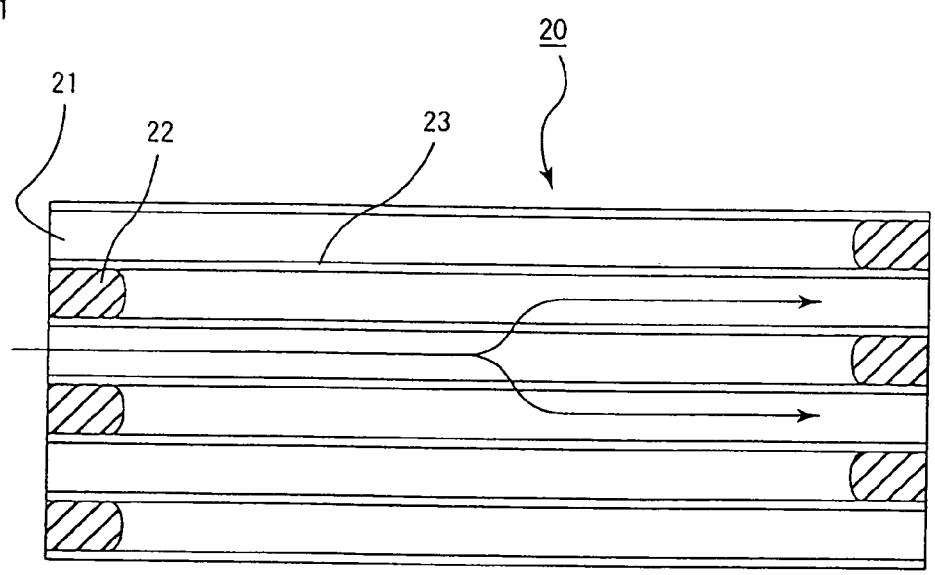
FIG. 2B is a cross-sectional view taken along line A-A thereof.

FIG. 1 is a perspective view that schematically shows the honeycomb structured body according to one embodiment of the first aspect of the present invention, FIG. 2A is a perspective view that shows porous ceramic members constituting the honeycomb structured body shown in FIG. 1, and FIG. 2B is a cross-sectional view taken along line A-A of the porous ceramic member shown in FIG. 2A.

As shown in FIG. 1, the honeycomb structured body according to one embodiment of the first aspect of the present invention is an aggregated-type honeycomb structured body 10 in which a plurality of porous ceramic members 20 made of silicon carbide or the like are combined with each other through adhesive layers 11 to form a cylindrical ceramic block 15, and a sealing material layer (coat layer) 12 is formed on the periphery of this ceramic block 15.

In the honeycomb structured body 10 according to one embodiment of the first aspect of the present invention shown in FIG. 1, the shape of the ceramic block is a cylindrical shape, however, the honeycomb structured body of the present invention is not limited to the cylindrical shape as long as it has a pillar shape, and any shape, such as an cylindroid shape and a rectangular pillar shape, may be used.

In the present specification, the shape indicated by the word "pillar" refers to any desired shape of a pillar including a round pillar, a polygonal pillar, an oval pillar, or the like.

As shown in FIG. 2A and FIG. 2B, the porous ceramic member 20 has a number of cells 21 placed in parallel with one another in the longitudinal direction so that cell walls (wall portions) 23 that separate the cells 21 are allowed to function as filters. In other words, each of the cells 21 formed in the porous ceramic member 20 has either one of the ends on the inlet side or the outlet side of exhaust gases sealed with a plug 22 as shown in FIG. 2B so that exhaust gases that have flowed into one of the cells 21 are allowed to flow out of another cell 21 after surely having passed through a cell wall 23 that separates the cells 21.

The honeycomb structured body according to the embodiments of the first aspect of the present invention is mainly made of porous ceramics, and with respect to the material, examples thereof include: nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite and silica. Here, the honeycomb structured body 10 may be formed by using materials of two or more kinds, such as a composite body of silicon and silicon carbide, and aluminum titanate. In the case where the composite body of silicon and silicon carbide is used, silicon is desirably added thereto to make up to at least about 0% and at most about 45% by weight of the entire body.

With respect to the porous ceramic material, a silicon carbide based ceramic material which has a high heat resistance, is superior in mechanical characteristics and has a high thermal conductivity is desirably used. Here, the silicon carbide based ceramic material refers to a material having a silicon carbide content of about 60% by weight or more.

The honeycomb structured body 10 according to one embodiment of the first aspect of the present invention is a honeycomb structured body with a catalyst supporting layer adhered thereto, and a catalyst is supported on the catalyst supporting layer.

With respect to the catalyst, although not particularly limited, those which can reduce the activation energy for burning particulates so that the particulates are readily burned, or those which can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metals, an element, such as an alkali metal (Group 1 in Element Periodic Table), an alkali earth metal (Group 2 in Element Periodic Table), a rare-earth element (Group 3 in Element Periodic Table) and a transition metal element may be supported thereon.

By adhering a catalyst supporting layer to the honeycomb structured body 10, and supporting a catalyst on the catalyst supporting layer, the honeycomb structured body 10 may more easily function as a filter capable of capturing particulates in exhaust gases, and also function as a catalyst converter for converting CO, HC, NOx and the like contained in exhaust gases.

Moreover, when the catalyst is adhered to the honeycomb structured body 10, it is desirable to apply the catalyst after the surface of the honeycomb structured body is coated with a catalyst supporting layer such as alumina. With this arrangement, the specific surface area is made greater so that the degree of dispersion of the catalyst is improved and thus it may become easier to increase the reaction sites of the catalyst. Further, since it may become easier to prevent sintering of the catalyst metal by the catalyst supporting layer, the heat resistance of the catalyst is also improved.

With respect to the catalyst supporting layer, oxide ceramics such as alumina, titania, zirconia, silica and ceria can be used.

In the honeycomb structured body according to the embodiments of the first aspect of the present invention, the average pore diameter of the porous ceramic member is larger than an average particle diameter of particles constituting the catalyst supporting layer, and when a pore diameter distribution of the porous ceramic member and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic member.

Hereinafter, the ratio of the pore volume in the overlapped area of both distributions to the entire pore volume of the porous ceramic member is simply referred to as "volume ratio of the overlapped area".

By using a porous ceramic member having a pore diameter distribution in which the volume ratio of the overlapped area is about 10% or less, the possibility of occurrence of clogged pores caused by the particles constituting the catalyst supporting layer becomes extremely small, and thereby increase in the pressure loss of the honeycomb structured body may be more easily prevented, and as a result a honeycomb structured body that is allowed to function sufficiently as a catalyst converter may be more easily provided.

When the above-mentioned volume ratio of the overlapped area is about 10% or less, since the possibility of occurrence of clogged pores caused by the particles constituting the catalyst supporting layer is less likely to increase, the pressure loss of the honeycomb structured body tends not to become high.

With respect to the porosity of the porous ceramic member 20, although not particularly limited, the lower limit value is desirably set to about 40% and the upper limit value is desirably set to about 75%. The porosity of about 40% or more tends not to increase the pressure loss, and the porosity of about 75% or less may more easily provide a honeycomb structured body having sufficient strength.

The upper limit value of the porosity of the porous ceramic member 20 is more desirably set to about 65%.

With respect to the amount of the catalyst supporting layer, although not particularly limited, the lower limit value is desirably set to about 20 g/L, and the upper limit value is desirably set to about 150 g/L.

With the amount of the catalyst supporting layer set to the above-mentioned range, the catalyst may be more easily dispersed well, and the pressure loss may be more easily prevented from becoming high.

The amount of the catalyst supporting layer is the weight (g) per liter of the apparent volume of the honeycomb structured body.

With respect to the average pore diameter of the honeycomb structured body 10, the lower limit value is desirably set to about 10 μm, and the upper limit value is desirably set to about 50 μm. The average pore diameter of about 10 μm or more tends not to cause high pressure loss after adhesion of the catalyst supporting layer. In contrast, the average pore diameter of about 50 μm or less is less likely to allow particulates to easily pass through the pores, so that the particulates may be more easily captured without fail and the honeycomb structured body may sufficiently function as a filter.

The above-mentioned porosity can be measured through known methods such as a mercury injection method, Archimedes method and a measuring method using a scanning electron microscope (SEM).

With respect to the particle diameter of the ceramic used upon manufacturing the honeycomb structured body 10, although not particularly limited, those which are less susceptible to shrinkage in the succeeding firing process are desirably used, and for example, those powders, prepared by combining 100 parts by weight of powders having an average particle diameter of at least about 0.3 μm and at most about 50 μm with at least about 5 parts by weight and at most about 65 parts by weight of powders having an average particle diameter of at least about 0.1 μm and at most about 1.0 μm, are desirably used.

The integral honeycomb structured body comprising a porous ceramic can be manufactured by blending and mixing ceramic powders having the above-mentioned particle diameter. The porosity and the rate of pores having a pore diameter of about 10 μm or less may be more easily adjusted to a certain degree by selecting the average particle diameters of powders.

The plug 22 and the wall portion 23 that configure the porous ceramic member 20 are desirably made from the same porous ceramic material. With this arrangement, the contact strength between the two members may be more easily increased, and by adjusting the porosity of the plug 22 in the same manner as the wall portions 23, the coefficient of thermal expansion of the wall portions 23 and the coefficient of thermal expansion of the plug 22 may be more properly adjusted so that it may become easier to prevent a gap from being generated between the plug 22 and the wall portions 23 due to a thermal stress upon production and in use and also to prevent cracks from occurring in the plug 22 and at portions of the wall portions 23 that are made contact with the plug 22. Here, the wall portion refers to both the cell wall separating the cells 21 and the peripheral portion.

With respect to the thickness of the plug 22, although not particularly limited, in the case where the plug 22 is made from porous silicon carbide or a composite body of silicon and silicon carbide, it is desirably set to at least about 1 mm and at most about 20 mm, more desirably in the range of about 3 mm to about 10 mm.

The thickness of the cell wall 23 is not particularly limited, and the lower limit value is desirably set to about 0.1 mm, while the upper limit value is desirably set to about 0.6 mm. With the thickness of about 0.1 mm or more, the strength of the honeycomb structured body 10 may tend to be sufficient. The thickness about 0.6 mm or less may be less likely to cause high pressure loss.

In the honeycomb structured body 10 according to the embodiments of the present invention, the adhesive layer 11, which is formed between the porous ceramic members 20, functions as an adhesive (or a sealing material) used for binding a plurality of the porous ceramic members 20 to one another. In contrast, the sealing material layer 12, which is formed on the peripheral face of the honeycomb block 15, is also allowed to function as a sealing material used for preventing exhaust gases passing through the cells from leaking from the peripheral face of the honeycomb block 15 when the honeycomb structured body 10 is placed in an exhaust passage of an internal combustion engine, and as an reinforcing member used for improving the strength thereof as well as adjusting the shape of the honeycomb block 15.

Here, in the honeycomb structured body 10, the adhesive layer 11 and the sealing material layer 12 may be formed by using the same material or different materials. In the case where the adhesive layer 11 and the sealing material layer 12 are made from the same material, the compounding ratio of materials thereof may be the same or may be different. Moreover, the material may have either a dense structure or a porous structure.

With respect to the material used for constituting the adhesive layer 11 and the sealing material layer 12, although not particularly limited, for example, a material, made from inorganic fibers and/or inorganic particles in addition to an inorganic binder and an organic binder, may be used.

With respect to the above-mentioned inorganic binder, examples thereof include silica sol and alumina sol. Each of these materials may be used alone, or two or more kinds of these may be used in combination. Among the above-mentioned inorganic binders, silica sol is more desirably used.

With respect to the organic binder, examples thereof include: polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is more desirably used.

With respect to the inorganic fibers, examples thereof include: ceramic fibers such as silica-alumina, mullite, alumina and silica. Each of these may be used alone, or two or more kinds of these may be used in combination. Among the above-mentioned inorganic fibers, silica-alumina fibers are more desirably used.

With respect to the inorganic particles, examples thereof include: carbides, nitrides and the like, more specifically, inorganic powder containing silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres comprising oxide-based ceramics and a pore-forming agent such as spherical acrylic particles or graphite may be added to the above-mentioned paste used for forming the sealing material layer and adhesive layer, if necessary.

With respect to the above-mentioned balloons, although not particularly limited, for example, alumina balloons, glass micro balloons, shirasu balloons, fly ash balloons (FA balloons), mullite balloons and the like maybe used. Among these, alumina balloons are more desirably used.

Here, the honeycomb structured body of the present invention with catalyst supported on the catalyst supporting layer is allowed to function as a gas purifying device in the same manner as conventionally known DPFs (Diesel Particulate Filters) with a catalyst. Therefore, with respect to the case where the integral honeycomb structured body of the present invention is used also as a catalyst supporting carrier, detailed description of the functions thereof is omitted.

Next, the following description will discuss one example of a manufacturing process of the honeycomb structured body according to one embodiment of the first aspect of the present invention.

First, an extrusion-molding process is carried out by using material paste mainly comprising the above-mentioned ceramic material so that a square-pillar shaped ceramic molded body is manufactured.

Although the material paste is not particularly limited, material paste which sets the porosity of the honeycomb structured body after manufacturing at least about 40% and at most about 75% is desirable, and, for example, a material paste prepared by adding a binder, a dispersant solution and the like to powder containing the above-mentioned ceramics may be used.

With respect to the particle diameter of the ceramic powder, although not particularly limited, those which are less susceptible to shrinkage in the succeeding firing process are desirably used, and for example, those powders, prepared by combining 100 parts by weight of powders having an average particle diameter of at least about 0.3 μm and at most about 50 μm with at least about 5 parts by weight and at most about 65 parts by weight of powders having an average particle diameter of at least about 0.1 μm and at most about 1.0 μm, are preferably used.

In order to adjust the pore diameter and the like of the porous ceramic member, the firing temperature needs to be adjusted; however, the pore diameter may be more easily adjusted by adjusting the particle diameter of the ceramic powder.

With respect to the above-mentioned binder, although not particularly limited, examples thereof include methyl cellulose, carboxymethyl cellulose, hydroxyethyl cellulose, polyethylene glycol and the like.

In general, the compounding amount of the above-mentioned binder is desirably set to at least about 1 part by weight and at most about 10 parts by weight with respect to 100 parts by weight of the ceramic powder.

With respect to the dispersant solution, although not particularly limited, examples thereof include: an organic solvent such as benzene; alcohol such as methanol; water, and the like.

An appropriate amount of the above-mentioned dispersant solution is mixed therein so that the viscosity of the material paste is set within a fixed range.

The ceramic powder, binder and dispersant solution are mixed by an attritor or the like, and sufficiently kneaded by a kneader or the like, and then extrusion-molded.

Moreover, a molding auxiliary may be added to the material paste, if necessary.

With respect to the molding auxiliary, although not particularly limited, examples thereof include ethylene glycol, dextrin, fatty acid soap, fatty acid, polyvinyl alcohol and the like.

Moreover, balloons that are fine hollow spheres comprising oxide-based ceramics and a pore-forming agent such as spherical acrylic particles or graphite maybe added to the above-mentioned material paste, if necessary.

With respect to the above-mentioned balloons, although not particularly limited, examples thereof include: alumina balloons, glass micro-balloons, shirasu balloons, fly ash balloons (FA balloons), mullite balloons and the like. Among these, alumina balloons are more desirably used.

Next, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug paste, which forms plugs, is filled in the end portion on the outlet side of the inlet-side group of cells and the end portion on the inlet side of the outlet-side group of cells so that the cells are sealed.

With respect to the plug paste, although not particularly limited, such paste that sets the porosity of a plug produced through the succeeding processes to at least about 30% and at most about 75% is desirably used, and for example, the same paste as the material paste may be used.

Next, the ceramic dried body filled with the plug paste is subjected to degreasing (for example, at the temperature of at least about 200° C. and at most about 500° C.) and firing processes (for example, at the temperature of at least about 1400° C. and at most about 2300° C.) under predetermined conditions so that a porous ceramic member 20, made from porous ceramics and constituted by a single sintered body as a whole, is manufactured.

Here, with respect to the degreasing and firing conditions of the ceramic dried body, it is possible to apply conditions that have been conventionally used for manufacturing a filter made from porous ceramics.

Next, in the honeycomb structured body according to one embodiment of the first aspect of the present invention, an adhesive paste to form the adhesive layer 11 is applied to each of the side faces of the porous ceramic member 20 with an even thickness to form an adhesive paste layer, and by repeating a process for successively laminating another porous ceramic member 20 on this adhesive paste layer, a porous ceramic member aggregated body having a predetermined size is manufactured.

With respect to the material for constituting the adhesive paste, since it has been explained, the explanation thereof is omitted.

Next, the porous ceramic member aggregated body is heated so that the adhesive paste layer is dried and solidified to form the adhesive layer 11.

Moreover, the porous ceramic member aggregated body in which a plurality of the porous ceramic members 20 are bonded to one another through the adhesive layers 11 is subjected to a cutting process by using a diamond cutter and the like so that a ceramic block 15 having a cylindrical shape is manufactured.

By forming a sealing material layer 12 on the outer periphery of the honeycomb block 15 by using the sealing material paste, a honeycomb structured body 10 in which the sealing material layer 12 is formed on the peripheral portion of the cylindrical ceramic block 15 having a plurality of the porous ceramic members 20 bonded to one another through the adhesive layers 11 can be manufactured.

The honeycomb structured body according to one embodiment of the first aspect of the present invention provides a structure in which a catalyst supporting layer is formed, and desirably, a catalyst such as a noble metal or the like is added to this catalyst supporting layer.

After the above process, the catalyst is supported, however the catalyst supporting process may be conducted before manufacturing the above-mentioned aggregated body.

With respect to the method for forming the catalyst supporting layer made from alumina on the surface of the ceramic fired body, for example, a method in which the ceramic fired body is impregnated with a solution containing alumina powder and heated may be proposed.

Thereafter, the ceramic fired body may be impregnated with a solution of a metal compound containing a rare-earth element such as $Ce(NO_3)_3$ or the like.

Here, upon preparing the alumina powder, a solution of a metal compound containing a rare-earth element such as $Ce(NO_3)_3$ or the like, and a solution of a metal compound containing aluminum such as $Al(NO_3)_3$ are mixed so that these elements are preliminarily allowed to stay in a mixed state, and the resulting powder containing alumina and ceria in a mixed state may be ground and supported.

With respect to the method for applying the catalyst to the alumina film, for example, a method in which a ceramic fired body is impregnated with, for example, a nitric acid solution of diammine dinitro platinum ($[Pt(NH_3)_2(NO_2)_2]HNO_3$) and then heated may be proposed.

The use of the honeycomb structured body according to the embodiments of the first aspect of the present invention is not particularly limited, and it is desirably used as an exhaust gas purifying device for vehicles. The same can be said for the honeycomb structured body of the second aspect of the present invention mentioned below.

Figure 3:
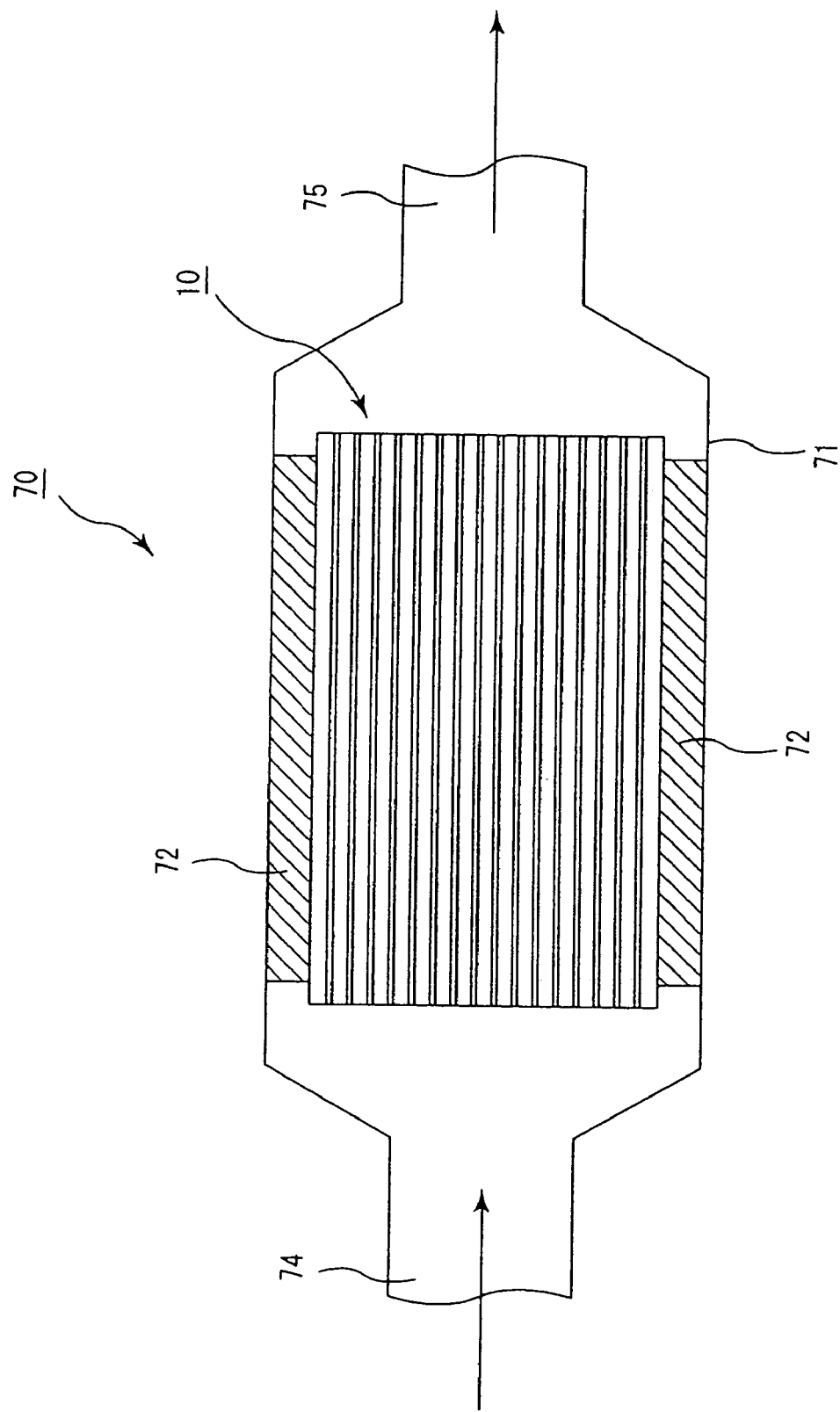
FIG. 3 is a cross-sectional view that schematically shows one example of an exhaust gas purifying device of a vehicle in which the honeycomb structured body according to one embodiment of the present invention is installed.

FIG. 3 is a cross-sectional view that schematically shows one example of an exhaust gas purifying device for a vehicle in which the honeycomb structured body according to one embodiment of the present invention is installed.

As shown in FIG. 3, an exhaust gas purifying device 70 is mainly configured by a honeycomb structured body 10, a casing 71 that covers the outside of the honeycomb structured body 10, and a holding sealing material 72 placed between the honeycomb structured body 10 and the casing 71, and an introducing pipe 74 coupled to an internal combustion system such as an engine is connected to the end portion of the casing 71 on the side to which exhaust gases are introduced, with an exhaust pipe 75 coupled to the outside being connected to the other end portion of the casing 71. In FIG. 3, arrows indicate flows of exhaust gases.

In the exhaust gas purifying device 70 having the above-mentioned configuration, exhaust gases, discharged from an internal combustion system such as an engine, are introduced into the casing 71 through the introducing pipe 74, and allowed to flow into the honeycomb structured body from the inlet side cells and pass through a wall portion so that, after particulates therein have been captured by this wall portion to purify the exhaust gases, the resulting exhaust gases are discharged outside the honeycomb structured body from the outlet side cells through the exhaust pipe 75. Moreover, catalyst is adhered to the honeycomb structured body, and thereby toxic gas components such as CO, HC and NOx in exhaust gases may be able to be converted.

In the exhaust gas purifying device 70, when a large amount of particulates are disposed on the wall portion of the honeycomb structured body and the pressure loss becomes high, a regenerating process of the honeycomb structured body is carried out.

In the regenerating process, particulates may be burned and removed using a post-injection method, or may be carried out by using reaction heat derived from a catalyst supporting layer and catalyst layer further formed in front of the honeycomb structured body. Moreover, the particulates disposed on the wall portion of the honeycomb structured body may be burned and removed through a method in which the honeycomb structured body is heated by allowing gases which are heated using a heating means, not shown, to flow into the cells of the honeycomb structured body.

In the honeycomb structured body of the present invention to which a catalyst is adhered, particulates can be burned and removed at a lower temperature than the normal temperature depending on the type and the like of the catalyst.

Next, a honeycomb structured body according to the embodiments of the second aspect of the present invention will be described.

The honeycomb structured body according to the embodiments of the second aspect of the present invention is a honeycomb structured body comprising a porous ceramic having a plurality of cells which are allowed to penetrate in a longitudinal direction with a wall portion therebetween and either one end of which is sealed, with a catalyst supporting layer being adhered to the wall portion, wherein an average pore diameter of the porous ceramic is larger than an average particle diameter of particles constituting the catalyst supporting layer, and when a pore diameter distribution of the porous ceramic and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic.

Figure 4A:
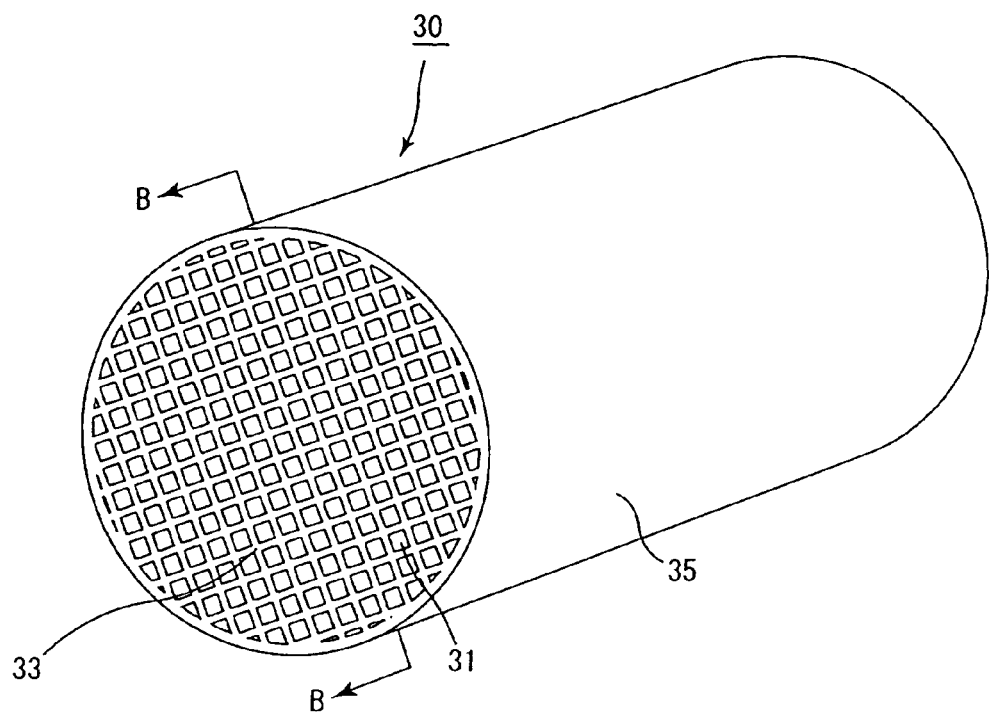
FIG. 4A is a cross-sectional view that schematically shows a honeycomb structured body according to one embodiment of the second aspect of the present invention.
Figure 4B:
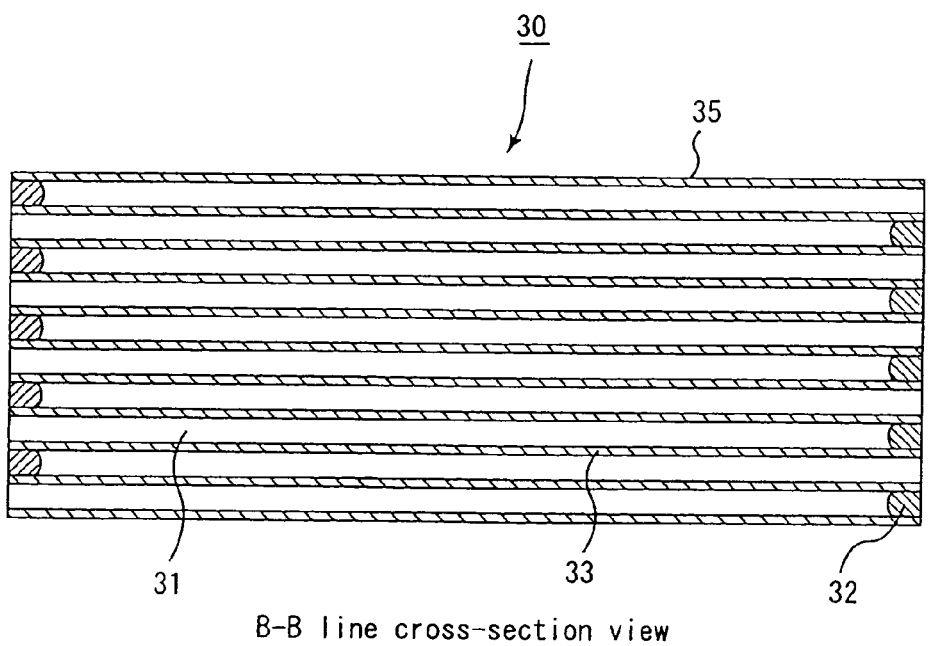
FIG. 4B is a cross-sectional view taken along line B-B thereof.

FIG. 4A is a perspective view that schematically shows a specific example of an integral honeycomb structured body which is another example of the honeycomb structured body according to one embodiment of the second aspect of the present invention, and FIG. 4B is a cross-sectional view taken along line B-B of FIG. 4A.

As shown in FIG. 4A, the honeycomb structured body 30 according to one embodiment of the present invention is formed by a cylindrical ceramic block 35 comprising a porous ceramic in which a number of cells 31 are placed in parallel with one another in the longitudinal direction with a cell wall (wall portion) 33 therebetween. Here, the wall portion refers to both the cell wall that separates the cells 31, and the outer peripheral portion of the ceramic block.

As shown in FIG. 4B, in the honeycomb structured body 30 according to one embodiment of the second aspect of the present invention, the ceramic block 35 has a structure in which either one of the end portions of the cell 31 is sealed with a plug 32.

In other words, in the ceramic block 35 of the honeycomb structured body 30 according to one embodiment of the present invention, predetermined cells 31 are sealed with the plugs 32 at one of the end portions, and at the other end portion of the ceramic block 35, the cells 31 that are not sealed with the plugs 32 at the other end portion are sealed with the plugs 32.

In this structure, exhaust gases that have flowed into one cell 31 are always allowed to flow out of another cell 31 after having passed through the cell wall 33 separating the cells 31 so that the cell wall 33 separating the cells 31 from each other is allowed to function as a particle capturing filter.

Although not shown in FIG. 4, in the same manner as the honeycomb structured body 10 shown in FIG. 1, a sealing material layer may be formed on the periphery of the ceramic block 35.

The porous ceramic material constituting the honeycomb structured body is not particularly limited, and examples thereof include: oxide ceramics such as cordierite, alumina, silica, mullite, zirconia, and yttria; carbide ceramics such as silicon carbide, zirconium carbide, titanium carbide, tantalum carbide and tungsten carbide; nitride ceramics such as aluminum nitride, silicon nitride, boron nitride and titanium nitride. Here, the honeycomb structured body 30 may be formed by using materials of two or more kinds, such as a composite body of silicon and silicon carbide, and aluminum titanate. In the case where the composite body of silicon and silicon carbide is used, silicon is desirably added thereto to make up to at least about 0% and at most about 45% by weight of the entire body.

Among those materials, cordierite or aluminum titanate may be preferably used. This material cuts manufacturing costs, and has a comparatively low coefficient of thermal expansion so that, for example, possibility of breakage during use of the honeycomb structured body of the present invention as the honeycomb filter tends to be small.

With respect to the honeycomb structured body 30 according to one embodiment of the second aspect of the present invention as shown in FIG. 4A and FIG. 4B, the shape of the ceramic block 35 is a cylindrical shape; however, the ceramic block of the present invention is not limited to the cylindrical shape as long as it has a pillar shape, and any desired shape, such as an cylindroid shape and a rectangular pillar shape, may also be used.

The honeycomb structured body 30 according to one embodiment of the second aspect of the present invention is a honeycomb structured body configured with a catalyst supporting layer adhered thereto, and a catalyst supported on the catalyst supporting layer.

With respect to the catalyst, although not particularly limited, those which can reduce the activation energy for burning particulates or can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metals, an element, such as an alkali metal (Group 1 in Element Periodic Table), an alkali earth metal (Group 2 in Element Periodic Table), a rare-earth element (Group 3 in Element Periodic Table) and a transition metal element may be supported thereon.

Such honeycomb structured body 30 may make it possible to convert CO, HC, and NOx and the like in exhaust gases.

By supporting a catalyst on the catalyst supporting layer of the honeycomb structured body 30, the honeycomb structured body 30 is allowed to function as a filter capable of capturing particulates in exhaust gases, and also to function as a catalyst converter for converting CO, HC, NOx and the like contained in exhaust gases.

Moreover, when applying the catalyst to the ceramic block 35, it is desirable to apply the catalyst after the surface of the ceramic block 35 is coated with a catalyst supporting layer such as alumina, as described above. With this arrangement, the specific surface area is made greater so that the degree of dispersion of the catalyst is improved and it may become easier to increase the reaction sites of the catalyst. Since it may become easier to prevent sintering of the catalyst metal by the catalyst supporting layer, the heat resistance of the catalyst may be also improved.

With respect to the catalyst supporting layer, oxide ceramics such as alumina, titania, zirconia, silica and ceria can be used.

Moreover, by supporting the catalyst on the catalyst supporting layer, oxidation reaction and the like progress on the catalyst, and reaction heat is generated, thereby it may become easier to raise the temperature of the honeycomb structured body 30.

With respect to the honeycomb structured body according to the embodiments of the second aspect of the present invention, an average pore diameter of the porous ceramic is larger than an average particle diameter of particles constituting the catalyst supporting layer, and when a pore diameter distribution of the porous ceramic and a particle diameter distribution of particles constituting the catalyst supporting layer are drawn with the pore diameter and the particle diameter being on the same axis, a pore volume in an overlapped area of both the distributions is about 10% or less to the entire pore volume of the porous ceramic.

With respect to the honeycomb structured body according to one embodiment of the second aspect of the present invention, by using a porous ceramic having a pore diameter distribution in which the volume ratio of the overlapped area is about 10% or less, the fine pores among the pores of the porous ceramic become larger than the particles constituting the catalyst supporting layer, leading to an extremely small possibility of occurrence of clogged pores caused by the particles constituting the catalyst supporting layer, and thereby increase in the pressure loss of the honeycomb structured body may be more easily prevented, and the contact area of the catalyst with exhaust gases and the like may be able to be kept large. As a result, a honeycomb structured body that is allowed to function sufficiently as a catalyst converter may be more easily provided.

When the above-mentioned volume ratio of the overlapped area is about 10% or less, among the particles constituting the catalyst supporting layer, the rate of particles having a diameter larger than the diameter of fine pores of the porous ceramic tends not to become high, which may make it less likely to increase the possibility of occurrence of clogged pores caused by the particles constituting the catalyst supporting layer, and thus the pressure loss of the honeycomb structured body may be less likely to become high.

With respect to the porosity of the ceramic block 35, although not particularly limited, the lower limit value is desirably set to about 40% and the upper limit value is desirably set to about 75%. If the porosity is about 40% or more, the rate of the fine pores relative to the entire pore volume tends to become high, making it easier to set the volume ratio of the overlapped area to about 10% or less, even when the particle diameter of particles constituting the catalyst supporting layer is adjusted, and thereby the pressure loss may be less likely to increase. On the other hand, if the porosity is about 75% or less, it may become easier to provide a honeycomb structured body with sufficient strength.

The upper limit value of the porosity of the ceramic block 35 is more desirably set to about 65%.

With respect to the amount of the catalyst supporting layer, although not particularly limited, the lower limit value is desirably set to about 20 g/L, and the upper limit value is desirably set to about 150 g/L. By setting the amount of the catalyst supporting layer within the above-mentioned range, the catalyst may be more easily dispersed well, and the pressure loss may be more easily prevented from becoming high.

Moreover, with respect to the average pore diameter of the ceramic block 35, the lower limit value is desirably set to about 10 μm, and the upper limit value is desirably set to about 50 μm. If the average pore diameter is about 10 μm or more, a catalyst and a catalyst supporting layer may be more easily adhered. In contrast, the average pore diameter of about 50 μm or less tends not to allow particulates to easily pass through the pores, so that the particulates tend to be sufficiently captured and the honeycomb structured body functions as a filter sufficiently.

The above-mentioned porosity can be measured through known methods such as a mercury injection method, Archimedes method and a measuring method using a scanning electron microscope (SEM).

Moreover, in the ceramic block 35, with respect to the material for the plug, the thickness of cell walls, the material for the sealing material layer, the size and type of the cell, etc., those factors that are the same as those of the honeycomb structured body of the first aspect of the present invention maybe used; therefore, detailed description thereof is omitted herein.

The following description will discuss one example of a manufacturing method of the honeycomb structured body according to one embodiment of the second aspect of the present invention.

First, an extrusion-molding process is carried out by using material paste mainly comprising the above-mentioned ceramic material so that a cylindrical ceramic molded body to form a ceramic block is manufactured. Here, except that the shape of the molded body is a cylinder and that the dimension is larger in comparison with the honeycomb structured body according to the embodiment of the first aspect of the present invention, the same binder, dispersant and the like as those of the honeycomb structured body according to the embodiment of the first aspect of the present invention are used and the molded body is formed by using the same method; therefore, detailed description thereof is omitted herein.

Next, in the same manner as the honeycomb structured body according to the embodiment of the first aspect of the present invention, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug paste, which forms plugs, is filled in the end portion on the outlet side of the inlet-side group of cells and the end portion on the inlet side of the outlet-side group of cells so that the cells are sealed.

Then, as in the honeycomb structured body according to the embodiment of the first aspect of the present invention, the resulting product is degreased and fired to manufacture a ceramic block, a catalyst supporting layer is adhered to the wall portion, and catalyst is supported thereon.

In accordance with the honeycomb structured body according to the embodiments of the first and second aspect of the present invention, the pore diameters and the particle diameters are adjusted such that, when a pore diameter distribution of the porous ceramic and a particle diameter distribution of particles constituting the catalyst supporting layer are drawn with the pore diameter and the particle diameter being on the same axis, the pore volume in an overlapped area of both the distributions is about 10% or less to the entire pore volume of the porous ceramic. Therefore, within the particles constituting the catalyst supporting layer, the rate of those having such a particle diameter that the small pores of the porous ceramic are clogged may become extremely low, and thereby the pressure loss due to adhesion of the catalyst supporting layer may be more easily prevented from becoming high, and the honeycomb structured body of the first and second aspect of the present invention may be able to function as filters with catalysts supported thereon.

EXAMPLES

The following description will discuss the present invention in detail by means of examples; however, the present invention is not intended to be limited by these examples.

(Preparation of Catalyst Supporting Layer)

γ-alumina was mixed with water and nitric acid solution serving as a dispersant, and the resulting product was further ground by using a ball mill under 90 min$^{-1}$ to prepare an alumina slurry.

The particle diameter of the γ-alumina was adjusted by changing the particle diameter of the ingredient and the grinding time, and thus slurry 1, slurry 2, and slurry 3 were prepared.

Next, the prepared slurry was dried, and the particle diameter of 100 particles was measured using a scanning electron microscope (SEM) to obtain the particle diameter distribution.

Figure 5:
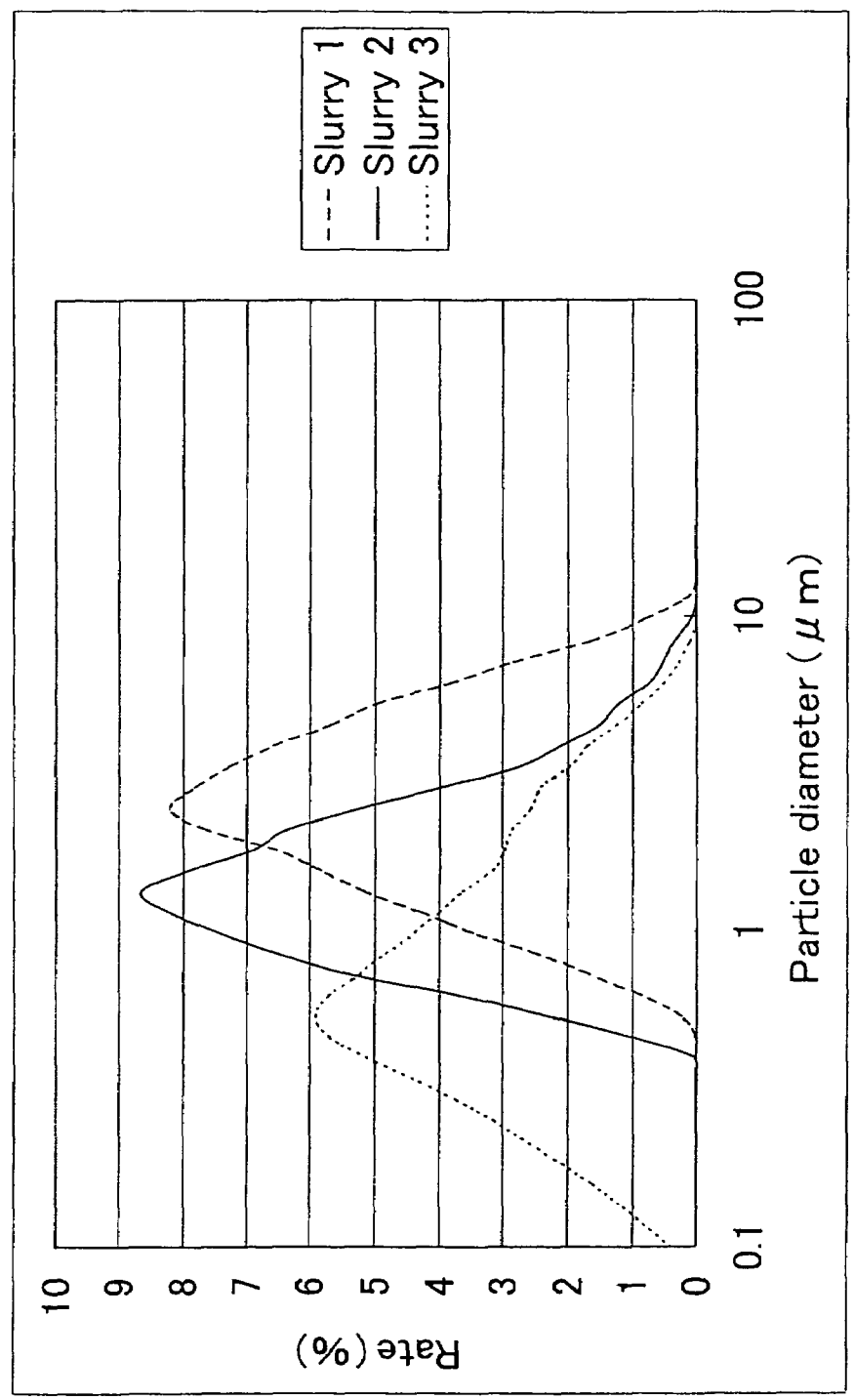
FIG. 5 is a graph that shows the particle size distribution of each of the slurries prepared in Examples.

The result is shown in FIG. 5.

Here, the average particle diameter of slurry 1 was 3.0 µm, the average particle diameter of slurry 2 was 1.8 µm, and the average particle diameter of slurry 3 was 1.1 µm. According to the distribution shown in FIG. 5, the maximum particle diameter was 13.2 µm for slurry 1, 11.3 µm for slurry 2, and 9.7 µm for slurry 3.

Example 1

Powder of α-type silicon carbide having an average particle diameter of 22 µm (6720 parts by weight) and powder of α-type silicon carbide having an average particle diameter of 0.5 µm (2880 parts by weight) were wet-mixed, and to 10000 parts by weight of the resulting mixture were added 980 parts by weight of acrylic particles having an average particle diameter of 40 µm, 1050 parts by weight of an organic binder (methyl cellulose) and 2970 parts by weight of water and kneaded to prepare a mixed composition.

Next, to the above-mentioned mixed composition were added 500 parts by weight of a plasticizer (trade name: Unilube, made by NOF Corporation) and 230 parts by weight of glycerin serving as a lubricant, followed by kneading, and then extrusion-molded to manufacture a raw molded body having a rectangular pillar shape as shown in FIG. 2A. Here the acrylic particles were added as a pore-forming agent for forming pores.

After the above-mentioned raw molded body had been dried by using a microwave drier or the like to manufacture a ceramic dried body, predetermined cells were filled with a plug material paste having the same composition as the raw molded body.

Next, after this had been again dried by using a drier, the resulting product was degreased at 400° C., and fired at 2200° C. in a normal-pressure argon atmosphere for 3 hours to manufacture a porous ceramic member 20 comprising a silicon carbide sintered body in which a porosity was 21.1%; an average pore diameter was 57.7 µm; the size was 34.3 mm×34.3 mm×150 mm; the number of cells 21 was 28 cells/cm$^2$; and a thickness of substantially all the wall portions 23 was 0.30 mm.

By using a heat resistant adhesive paste containing 30% by weight of alumina fibers having an average fiber length of 20µm, 21% by weight of silicon carbide particles having an average particle diameter of 0.6 µm, 15% by weight of silica sol, 5.6% by weight of carboxymethyl cellulose and 28.4% by weight of water, a number of porous ceramic members 20 were bonded to one another, and this was cut by using a diamond cutter so that a cylindrical-shaped ceramic block 15 was manufactured.

Next, 23.3% by weight of ceramic fibers made from alumina silicate (shot content: 3%, average fiber length: 100 µm) which served as inorganic fibers, 30.2% by weight of silicon carbide powder having an average particle diameter of 0.3 µm which served as inorganic particles, 7% by weight of silica sol (SiO$_2$ content in the sol: 30% by weight) which served as an inorganic binder, 0.5% by weight of carboxymethyl cellulose which served as an organic binder, and 39% by weight of water were mixed and kneaded to manufacture a sealing material paste.

Next, a sealing material paste layer having a thickness of 0.2 mm was formed on the peripheral portion of the ceramic block 15 by using the above-mentioned sealing material paste. Further, this sealing material paste layer was dried at 120° C. so that a cylindrical-shaped aggregated honeycomb structured body 10 having a size of 143.8 mm in diameter× 150 mm in length was manufactured.

Next, the honeycomb structured body was immersed in the slurry 1 prepared according to the above-mentioned preparation of catalyst supporting layer, and after being taken out, it was dried at 200° C. The above-mentioned processes were repeated until the alumina layer had reached the amount of 120 g/L, and the resulting honeycomb structured body was fired at 600° C.

Next, diammine dinitro platinum nitric acid ([Pt (NH$_3$)$_2$ (NO$_2$)$_2$]HNO$_3$) having a platinum concentration of 4.53% by weight was diluted with distilled water. The ceramic fired body on which the alumina layer containing a rare-earth oxide had been formed was immersed in the above-mentioned solution, heated at 110° C. for 2 hours, and further heated in a nitrogen atmosphere at 500° C. for one hour so that 5 g/L of a platinum catalyst having an average particle diameter of 2 nm was supported on the surface of the ceramic fired body, thereby completing the manufacturing process of the honeycomb structured body on which the catalyst was supported.

Examples 2 to 6, Comparative Examples 1 to 6

The same processes as those of Example 1 were carried out except that, in the process of forming a molded body, a mixed composition was formed by mixing respective components as shown in Table 1 and the molded body was manufactured by extrusion molding to manufacture a honeycomb structured body 10, and then a catalyst supporting layer and a catalyst were adhered to the resulting honeycomb structured body 10. Here, the amount of the platinum catalyst was set to a constant value, that is, 5 g/L.

TABLE 1

| | SiC coarse powder | | SiC fine powder | | Acrylic powder | | Methyl cellulose (part by weight) | Water (part by weight) | Plasticizer (part by weight) | Lubricant (part by weight) |
|---|---|---|---|---|---|---|---|---|---|---|
| | Particle diameter (µm) | Amount (part by weight) | Particle diameter (µm) | Amount (part by weight) | Particle diameter (µm) | Amount (part by weight) | | | | |
| Example 1 | 22 | 6720 | 0.5 | 2880 | 40 | 980 | 1050 | 2790 | 500 | 230 |
| Example 2 | 22 | 6720 | 0.5 | 2880 | 40 | 980 | 1050 | 2970 | 500 | 230 |
| Example 3 | 22 | 6720 | 0.5 | 2880 | 40 | 980 | 1050 | 2970 | 500 | 230 |
| Example 4 | 11 | 6720 | 0.5 | 2880 | 40 | 980 | 1050 | 2970 | 500 | 230 |
| Example 5 | 11 | 6720 | 0.5 | 2880 | 40 | 980 | 1050 | 2970 | 500 | 230 |
| Example 6 | 40 | 6720 | 0.5 | 2880 | 40 | 980 | 1050 | 2970 | 500 | 230 |
| Comparative Example 1 | 11 | 6720 | 0.5 | 2880 | 40 | 980 | 1050 | 2970 | 500 | 230 |
| Comparative Example 2 | 40 | 6720 | 0.5 | 2880 | 40 | 980 | 1050 | 2970 | 500 | 230 |

TABLE 1-continued

| | SiC coarse powder | | SiC fine powder | | Acrylic powder | | Methyl cellulose (part by weight) | Water (part by weight) | Plasticizer (part by weight) | Lubricant (part by weight) |
|---|---|---|---|---|---|---|---|---|---|---|
| | Particle diameter (μm) | Amount (part by weight) | Particle diameter (μm) | Amount (part by weight) | Particle diameter (μm) | Amount (part by weight) | | | | |
| Comparative Example 3 | 40 | 6720 | 0.5 | 2880 | 40 | 980 | 1050 | 2970 | 500 | 230 |
| Comparative Example 4 | 40 | 4550 | 0.5 | 1950 | 60 | 1060 | 550 | 1500 | 330 | 150 |
| Comparative Example 5 | 40 | 4550 | 0.5 | 1950 | 60 | 1060 | 550 | 1500 | 330 | 150 |
| Comparative Example 6 | 40 | 4550 | 0.5 | 1950 | 60 | 1060 | 550 | 1500 | 330 | 150 |

(Evaluation)

(1) Measurements of porosity and the like

Prior to adhering a catalyst supporting layer and a catalyst, the pore distribution was measured in a range of pore diameters from 0.1 to 360 μm by using a porosimeter (AutoPore III9420, manufactured by Shimadzu Corporation) by a mercury injection method.

The porosity and average pore diameter of the porous ceramic member 20, and the volume ratio of the overlapped area of the pore diameter distribution of the honeycomb structured body and the particle diameter distribution of the slurry which were used in each of the examples and comparative examples are shown in Table 2.

(2) Measurements of pressure loss

Before and after adhering a catalyst supporting layer and a catalyst, each of honeycomb structured bodies according to the examples and the comparative examples was installed in an exhaust passage of an engine, and by flowing air through it at a speed of 750 m³/hr, the pressure loss of the honeycomb structured body was measured. The results are shown in Table 2. In Table 2, the state before adhering the catalyst supporting layer and the catalyst is referred to as "before coating", and the state after adhering the catalyst supporting layer and the catalyst is referred to as "after coating".

As shown in Table 2, with respect to the aggregated honeycomb structured bodies according to each of the examples, in which the volume ratio of the overlapped area is about 10% or less, the pressure loss did not change much before and after adhesion of the catalyst supporting layer. That is, even after adhesion of the catalyst supporting layer, its value was low, within the range of 12.5 to 13.0 kPa. On the other hand, with respect to the honeycomb structured bodies according to each of the comparative examples, in which the volume ratio of the overlapped area is more than about 10%, the pressure loss is more than 13.0 when the catalyst supporting layer was adhered thereto, causing a higher initial pressure loss, and therefore it can be concluded that its use as a filter was difficult.

In the above-mentioned Examples, those honeycomb structured bodies formed by combining a plurality of porous ceramic members comprising a silicon carbide sintered body using a heat-resistance adhesive paste are illustrated as examples. However, since the characteristics of the present invention is to regulate the average pore diameter of the porous ceramic member and the porous ceramic as well as the average particle diameter of the particles constituting the catalyst supporting layer adhered to the honeycomb structured body, it may be considered that the change in the materials constituting the porous ceramic member or the porous

TABLE 2

| | Average pore diameter (μm) | Porosity (%) | Slurry No. | Volume ratio of overlapped area (%) | Pressure loss before coating (kPa) | Pressure loss after coating (kPa) |
|---|---|---|---|---|---|---|
| Example 1 | 21.1 | 57.7 | 1 | 9.7 | 12.4 | 12.7 |
| Example 2 | 21.1 | 57.7 | 2 | 5.3 | 12.4 | 12.6 |
| Example 3 | 21.1 | 57.7 | 3 | 2.5 | 12.4 | 12.6 |
| Example 4 | 18.8 | 57.7 | 2 | 9.8 | 12.5 | 12.8 |
| Example 5 | 18.8 | 57.7 | 3 | 5.8 | 12.5 | 12.7 |
| Example 6 | 17.5 | 57.8 | 3 | 7.3 | 12.4 | 12.7 |
| Comparative Example 1 | 18.8 | 57.7 | 1 | 16.1 | 12.5 | 13.6 |
| Comparative Example 2 | 17.5 | 57.8 | 1 | 21.9 | 12.4 | 14.2 |
| Comparative Example 3 | 17.5 | 57.8 | 2 | 13.5 | 12.4 | 13.4 |
| Comparative Example 4 | 18.3 | 57 | 1 | 22.5 | 12.4 | 14.3 |
| Comparative Example 5 | 18.3 | 57 | 2 | 15.4 | 12.4 | 13.6 |
| Comparative Example 6 | 18.3 | 57 | 3 | 10.9 | 12.4 | 13.2 | ceramic, if any, hardly affects the features of the honeycomb structured body, and thus it may be presumed to be possible to obtain the same effects even when materials other than silicon carbide are used.

What is claimed as new and desired to be secured by Letters Patent of the United States is:

1. A honeycomb structured body in which
a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion,
wherein
an average pore diameter of said porous ceramic member is larger than an average particle diameter of particles constituting said catalyst supporting layer, and
when a pore diameter distribution of said porous ceramic member and a particle diameter distribution of particles constituting said catalyst supporting layer are drawn with the pore diameter and the particle diameter being on the same axis,
a pore volume in an overlapped area of both the distributions is about 10% or less to the entire pore volume of said porous ceramic member.

2. The honeycomb structured body according to claim 1, wherein
said honeycomb structured body is made of silicon carbide based ceramics or a composite body of silicon and silicon carbide.

3. The honeycomb structured body according to claim 1, wherein
the porosity of said porous ceramic member is at least about 40% and at most about 75%.

4. The honeycomb structured body according to claim 3, wherein
the porosity of said porous ceramic member is in the range of about 40% to about 65%.

5. The honeycomb structured body according to claim 1, wherein
the average pore diameter of said honeycomb structured body is at least about 10 μm and at most about 50 μm.

6. The honeycomb structured body according to claim 1, wherein
the amount of said catalyst supporting layer is at least about 20 g/l and at most about 150 g/l.

7. The honeycomb structured body according to claim 1, wherein
said catalyst supporting layer comprises at least one of alumina, titania, zirconia, silica and ceria.

8. A honeycomb structured body comprising a porous ceramic having a plurality of cells which are allowed to penetrate in a longitudinal direction with a wall portion therebetween and either one end of which is sealed, with a catalyst supporting layer being adhered to the wall portion,
wherein
an average pore diameter of said porous ceramic is larger than an average particle diameter of particles constituting said catalyst supporting layer, and
when a pore diameter distribution of said porous ceramic and a particle diameter distribution of particles constituting said catalyst supporting layer are drawn with the pore diameter and the particle diameter being on the same axis,
a pore volume in an overlapped area of both the distributions is about 10% or less to the entire pore volume of said porous ceramic.

9. The honeycomb structured body according to claim 8, wherein
the honeycomb structured body is made of cordierite or aluminum titanate.

10. The honeycomb structured body according to claim 8, wherein
the porosity of said porous ceramic is at least about 40% and at most about 75%.

11. The honeycomb structured body according to claim 10, wherein
the porosity of said porous ceramic is in the range of about 40% to about 65%.

12. The honeycomb structured body according to claim 8, wherein
the average pore diameter of said honeycomb structured body is at least about 10 μm and at most about 50 μm.

13. The honeycomb structured body according to claim 8, wherein
the amount of said catalyst supporting layer is at least about 20 g/l and at most about 150 g/l.

14. The honeycomb structured body according to claim 8, wherein
said catalyst supporting layer comprises at least one of alumina, titania, zirconia, silica and ceria.

* * * * *